(12) United States Patent
Parady (10) Patent No.: US 6,907,520 B2
(45) Date of Patent: Jun. 14, 2005

(54) THRESHOLD-BASED LOAD ADDRESS PREDICTION AND NEW THREAD IDENTIFICATION IN A MULTITHREADED MICROPROCESSOR

(75) Inventor: Bodo K. Parady, Danville, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 569 days.

(21) Appl. No.: 10/044,487

(22) Filed: Jan. 11, 2002

(65) Prior Publication Data

US 2002/0091915 A1 Jul. 11, 2002

Related U.S. Application Data (60) Provisional application No. 60/261,435, filed on Jan. 11, 2001.

(51) Int. Cl.[7] .................................................. G06F 9/00
(52) U.S. Cl. ....................................................... 712/228
(58) Field of Search .......................... 718/102; 712/207, 712/225, 228

(56) References Cited

U.S. PATENT DOCUMENTS

| | | | | |
|---|---|---|---|---|
| 5,377,336 A | * | 12/1994 | Eickemeyer et al. | ........ 712/207 |
| 5,758,142 A | * | 5/1998 | McFarling et al. | ......... 712/239 |
| 5,822,788 A | * | 10/1998 | Kahn et al. | .................. 711/213 |
| 5,933,627 A | * | 8/1999 | Parady | ........................ 712/228 |
| 6,182,210 B1 | * | 1/2001 | Akkary et al. | ............... 712/235 |

OTHER PUBLICATIONS

Yoaz et al., "Speculation Techniques for Improving Load Related Instruction Scheduling," May 1999, pp. 42–53.*
Chen et al., "Effective Hardware–Based Data Prefetching for High–Performance Processors," 1993, pp. 609–623.*
"Load Latency Tolerance In Dynamically Scheduled Processors"; IEEE 98; Srinivasan & Lebeck; Duke University, Department of Computer Science; Durham, North Carolina.
"Discrete Last–Address Predictor"; Morancho, Llaberia, & Olive; Universitat Politecnica de Catalunya, Department d'Arquitectura de Computadores; Barcelona (Spain).
"Understanding the Differences Between Value Prediction and Instruction Reuse"; Sodani & Sohi; University of Wisconsin–Madison, Computer Sciences Department; Madison, Wisconsin.
"The Predictability of Data Values"; Sazeides & Smith; University of Wisconsin–Madison, Department of Electrical and Computer Engineering; Madison, Wisconsin.
"Speculative Execution via Address Prediction and Data Prefetching"; Gonzalez & Gonzalez; Universitat Politecnica de Catalunya, Department d'Arquitectura de Computadors; Barcelona (Spain).

* cited by examiner

Primary Examiner—Eddie Chan
Assistant Examiner—David J. Huisman
(74) Attorney, Agent, or Firm—Meyertons Hood Kivlin Kowert & Goetzel, P.C.; Rory D. Rankin (57) ABSTRACT

A method and apparatus for predicting load addresses and identifying new threads of instructions for execution in a multithreaded processor. A load prediction unit scans an instruction window for load instructions. A load prediction table is searched for an entry corresponding to a detected load instruction. If an entry is found in the table, a load address prediction is made for the load instruction and conveyed to the data cache. If the load address misses in the cache, the data is prefetched. Subsequently, if it is determined that the load prediction was incorrect, a miss counter in the corresponding entry in the load prediction table is incremented. If on a subsequent detection of the load instruction, the miss counter has reached a threshold, the load instruction is predicted to miss. In response to the predicted miss, a new thread of instructions is identified for execution.

24 Claims, 7 Drawing Sheets

THRESHOLD-BASED LOAD ADDRESS PREDICTION AND NEW THREAD IDENTIFICATION IN A MULTITHREADED MICROPROCESSOR

CROSS REFERENCE TO RELATED APPLICATIONS

This application claims benefit of priority to Provisional Application Ser. No. 60/261,435 filed Jan. 11, 2001, entitled "Load Prediction and Thread Identification in a Multi-threaded Microprocessor."

BACKGROUND OF THE INVENTION

1. Field of the Invention

This invention is related to the field of microprocessors and, more particularly, to data load prediction in a multi-threaded architecture.

2. Description of the Related Art

Superscalar microprocessors achieve high performance by executing multiple instructions per clock cycle and by choosing the shortest possible clock cycle consistent with the design. As used herein, the term "clock cycle" refers to an interval of time accorded to various stages of an instruction processing pipeline within the microprocessor. Storage devices (e.g. registers and arrays) capture their values according to the clock cycle. For example, a storage device may capture a value according to a rising or falling edge of a clock signal defining the clock cycle. The storage device then stores the value until the subsequent rising or falling edge of the clock signal, respectively. The term "instruction processing pipeline" is used herein to refer to the logic circuits employed to process instructions in a pipelined fashion. Although the pipeline may be divided into any number of stages at which portions of instruction processing are performed, instruction processing generally comprises fetching the instruction, decoding the instruction, executing the instruction, and storing the execution results in the destination identified by the instruction.

Another aspect of microprocessors which may impact performance is related to system memory accesses. Instructions and data which are to be utilized by a microprocessor are typically stored on fixed disk medium. Once a request is made by a user to execute a program, the program is loaded into the computer's system memory which usually comprises dynamic random access memory devices (DRAM). The processor then executes the program code by fetching an instruction from system memory, receiving the instruction over a system bus, performing the function dictated by the instruction, fetching the next instruction, and so on. In addition, data which is operated on by these instructions is ordinarily fetched from memory as well.

Generally, whenever system memory is accessed, there is a potential for delay between the time the request to memory is made (either to read or write data) and the time when the memory access is completed. This delay is referred to as "latency" and can limit the performance of the computer. There are many sources of latency. For example, operational constraints with respect to DRAM devices cause latency. Specifically, the speed of memory circuits is typically based upon two timing parameters. The first parameter is memory access time, which is the minimum time required by the memory circuit to set up a memory address and produce or capture data on or from the data bus. The second parameter is memory cycle time, which is the minimum time required between two consecutive accesses to a memory circuit. Upon accessing system memory, today's processors may have to wait 20 or more clock cycles before receiving the requested data and may be stalled in the meantime. In addition to the delays caused by access and cycle times, DRAM circuits also require periodic refresh cycles to protect the integrity of the stored data. These cycles may consume approximately 5 to 10% of the time available for memory accesses. If the DRAM circuit is not refreshed periodically, the data stored in the DRAM circuit will be lost. Thus, memory accesses may be halted while a refresh cycle is performed.

To expedite memory transfers, most computer systems today incorporate cache memory subsystems. Cache memory is a high-speed memory unit interposed between a slower system DRAM memory and a processor. Cache memory devices usually have speeds comparable to the speed of the processor and are much faster than system DRAM memory. The cache concept anticipates the likely reuse by the microprocessor of selected data in system memory by storing a copy of the selected data in the cache memory. When a read request is initiated by the processor for data, a cache controller determines whether the requested information resides in the cache memory. If the information is not in the cache, then the system memory is accessed for the data and a copy of the data may be written to the cache for possible subsequent use. If, however, the information resides in the cache, it is retrieved from the cache and given to the processor. Retrieving data from cache is faster than retrieving data from system memory where access latencies may be 100 times that of a first level cache.

Because latencies between the cache and processor are much less than between system memory and the processor, increasing the proportion of time that requested data is present in the cache is highly desirable. One possible method is to predict what data will be required and prefetch the data to the cache. If the prediction is correct, then the data will be readily available and the system memory access latency will have been eliminated. However, if the prediction is incorrect, access must be made to system memory and a load latency incurred.

An important feature of microprocessors is the degree to which they can take advantage of parallelism. Parallelism is the execution of instructions in parallel, rather than serially. Superscalar processors are able to identify and utilize fine grained instruction level parallelism by executing certain instructions in parallel. However, this type of parallelism is limited by data dependencies between instructions. By identifying higher levels of parallelism, computer systems may execute larger segments of code, or threads, in parallel. Because microprocessors and operating systems typically cannot identify these segments of code which are amenable to multithreaded execution, they are frequently identified by the application code itself. However, this requires the application programmer to specifically code an application to take advantage of multithreading or it requires that the compiler identify such threads.

SUMMARY OF THE INVENTION

The problems outlined above are in large part solved by a microprocessor and method as described herein. Additional circuitry is included which enables the prediction of load addresses and prefetch of load data. In addition, loads may be predicted to miss and an additional thread of execution may be setup for execution. Consequently, memory access latency may be hidden and processor resources more fully utilized by the execution of an additional thread while the load takes place.

Broadly speaking, a microprocessor including an instruction buffer, load prediction unit, and data cache are contemplated. The load prediction unit is coupled to both the instruction buffer and data cache and is configured to scan instructions in the instruction buffer for loads. Based on the detected load instruction, the load prediction unit may predict a load address for the load and may also identify the first instruction of a new thread of instructions. Further, the data cache is configured to receive the predicted load address from the load prediction unit and fetch the load data if it is not already present in the data cache.

In addition, a method of predicting load addresses and identifying a new thread of instructions is contemplated. First, a window of instructions is searched of load instructions. When a load instruction is detected, a load address prediction is made, if a valid entry exists in a load prediction table for the instruction. Subsequent to executing the load instruction, the corresponding table entry is updated. Also, if a load prediction table entry for a detected load instruction indicates a miss threshold has been met, the load is predicted to miss upon execution. Finally, in response to predicting a load will miss, a first thread instruction for a new thread is identified.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION
Processor Overview

Figure 1:
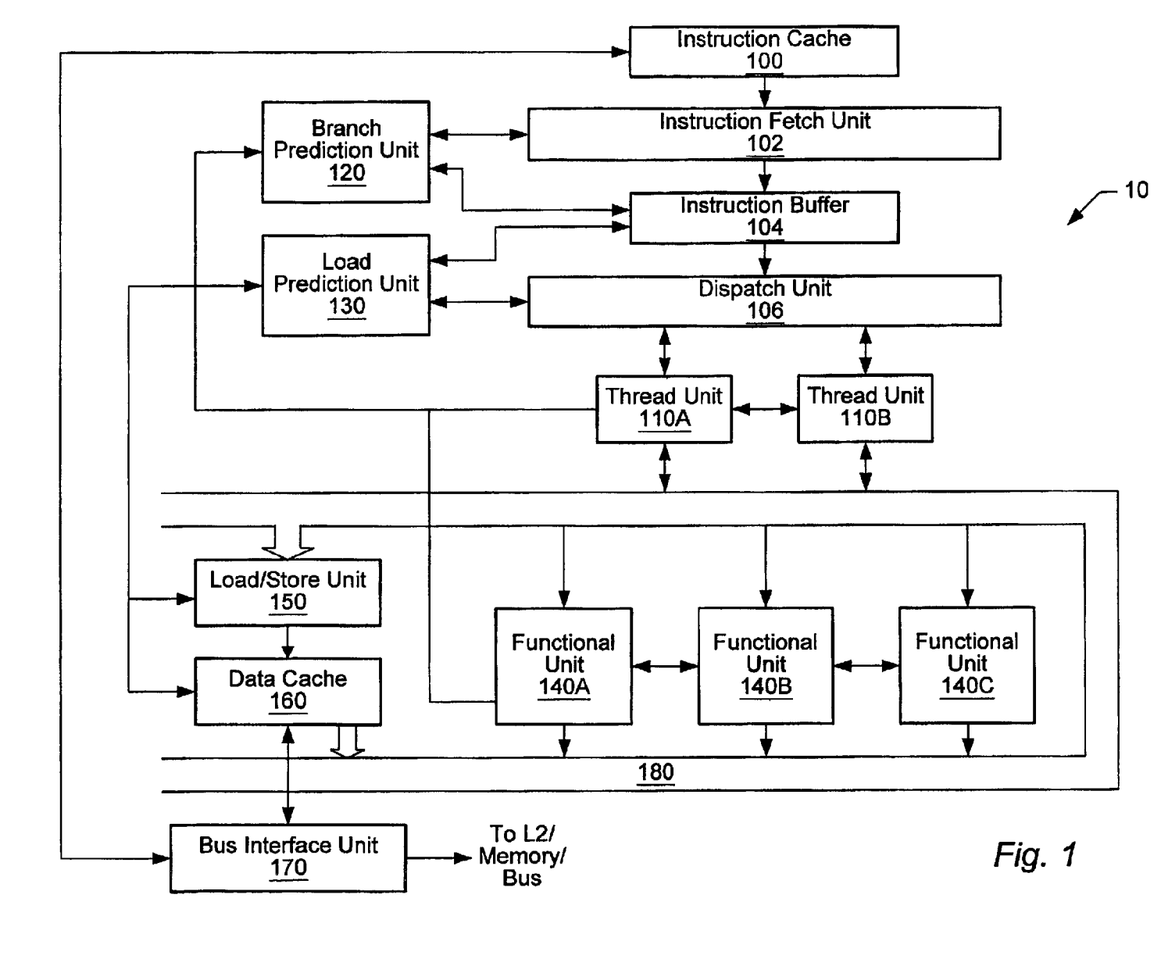
FIG. 1 is a block diagram of one embodiment of a microprocessor.

Turning now to FIG. 1, a block diagram of one embodiment of a processor 10 is shown. Other embodiments are possible and contemplated. As shown in FIG. 1, processor 10 includes an instruction cache 100, an instruction fetch unit 102, an instruction buffer 104, a dispatch unit 106, a branch prediction unit 120, a load prediction unit 130, a plurality of thread units 110A–110B, a plurality of functional units 140A–140C, a load/store unit 150, a data cache, 160 and a bus interface unit 170. Elements referred to herein with a particular reference number followed by a letter will be collectively referred to by the reference number alone. For example, functional units 140A–140C will be collectively referred to as functional units 140.

Instruction cache 100 is coupled to receive instructions from bus interface unit 170. Similarly, branch prediction unit 120 is coupled to instruction fetch unit 102 and instruction buffer 104. Still further, load prediction unit 130 is coupled to instruction buffer 104, dispatch unit 106, load/store unit 150 and data cache 160. Instruction cache 100 is further coupled to instruction fetch unit 102. Instruction fetch unit 102 is in turn coupled to instruction buffer 104. In addition, dispatch unit 106 is coupled to thread units 110. Data cache 160 is coupled to load/store unit 150 and to bus interface unit 170. Bus interface unit 170 is further coupled to an L2 interface to an L2 cache and a bus.

Instruction cache 100 is a high speed cache memory provided to store instructions. Instructions are fetched from instruction cache 100 and conveyed to instruction buffer 104. In one embodiment, instruction cache 100 is configured to store up to 64 kilobytes of instructions in a 2 way set associative structure having 64 byte lines (a byte comprises 8 binary bits). Alternatively, any other desired configuration and size may be employed. For example, it is noted that instruction cache 100 may be implemented as a fully associative, set associative, or direct mapped configuration.

Processor 10 employs branch prediction in order to speculatively fetch instructions subsequent to conditional branch instructions. Branch prediction unit 120 is included to perform branch prediction operations. Functional units 140 provide update information to branch prediction unit 120. Functional units 140 execute the branch instructions and determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch are discarded from the various units of processor 10. A variety of suitable branch prediction algorithms may be employed by branch prediction unit 120.

Instructions fetched from instruction cache 100 are conveyed by instruction fetch unit 102 to instruction buffer 104. Load prediction unit 130 scans instructions within instruction buffer 104 for loads. Upon detecting a load, load prediction unit 130 may cause a prefetch of data associated with the load. In addition, load prediction unit 130 may convey information to dispatch unit 106 which causes an additional thread of execution to be setup.

Processor 10 supports out of order execution, and may employ reorder buffers to keep track of the original program sequence for register read and write operations, to implement register renaming, to allow for speculative instruction execution and branch misprediction recovery, and to facilitate precise exceptions. A temporary storage location within reorder buffers is reserved upon decode of an instruction that involves the update of a register to thereby store speculative register states. If a branch prediction is incorrect, the results of speculatively-executed instructions along the mispredicted path can be invalidated in the buffer before they are written to the corresponding register file. Similarly, if a particular instruction causes an exception, instructions subsequent to the particular instruction may be discarded. In this manner, exceptions are "precise" (i.e. instructions subsequent to the particular instruction causing the exception are not completed prior to the exception). It is noted that a particular instruction is speculatively executed if it is executed prior to instructions which precede the particular instruction in program order. Preceding instructions may be a branch instruction or an exception-causing instruction, in which case the speculative results may be discarded by reorder buffers.

In one embodiment, each of the functional units 140 may be configured to perform integer arithmetic operations of addition and subtraction, shifts, rotates, logical operations, or branch operations. The operations are performed in response to the control values decoded for a particular instruction by decode units within thread units 110. It is noted that a floating point unit (not shown) may also be employed to accommodate floating point operations. Additionally, functional units 140 may be configured to perform address generation for load and store memory operations performed by load/store unit 150. In one particular embodiment, each functional unit 140 may comprise an address generation unit for generating addresses and an execute unit for performing the remaining functions. The two units may operate independently upon different instructions or operations during a clock cycle.

Each of the functional units 140 also provides information regarding the execution of conditional branch instructions to the branch prediction unit 120. If a branch prediction was incorrect, branch prediction unit 120 flushes instructions subsequent to the mispredicted branch that have entered the instruction processing pipeline, and causes fetch of the required instructions from instruction cache 100 or main memory. It is noted that in such situations, results of instructions in the original program sequence which occur after the mispredicted branch instruction are discarded.

Results produced by functional units 140 are sent to thread units 110 if a register value is being updated, and to load/store unit 150 if the contents of a memory location are changed. If the result is to be stored in a register, reorder buffers within thread units 110 may store the result in the location reserved for the value of the register when the instruction was decoded. A plurality of result buses 180 are included for forwarding of results from functional units 140 and load/store unit 150. Result buses 180 convey the result generated, as well as the reorder buffer tag identifying the instruction being executed.

Load/store unit 150 provides an interface between functional units 140 and data cache 160. Load/store unit 150 may also perform dependency checking for load memory operations against pending store memory operations to ensure that data coherency is maintained. A memory operation is a transfer of data between processor 10 and the main memory subsystem. Memory operations may be the result of an instruction which utilizes an operand stored in memory, or may be the result of a load/store instruction which causes the data transfer but no other operation.

Data cache 160 is a high speed cache memory provided to temporarily store data being transferred between load/store unit 150 and the main memory subsystem. It is understood that data cache 160 may be implemented in a variety of specific memory configurations, including a set associative configuration, a fully associative configuration, a direct-mapped configuration, and any suitable size of any other configuration.

In one particular embodiment of processor 10, load instruction memory references may require a translation of the memory address before being presented to the data cache or virtual memory unit. The translated address may be referred to as the "effective address".

Bus interface unit 170 is configured to communicate between processor 10 and other components in a computer system via a bus. Any suitable interconnect structure may be used including packet-based, unidirectional or bi-directional links, etc. An optional L2 cache interface may be employed as well for interfacing to a level two cache.

Load Latency

Figure 2:
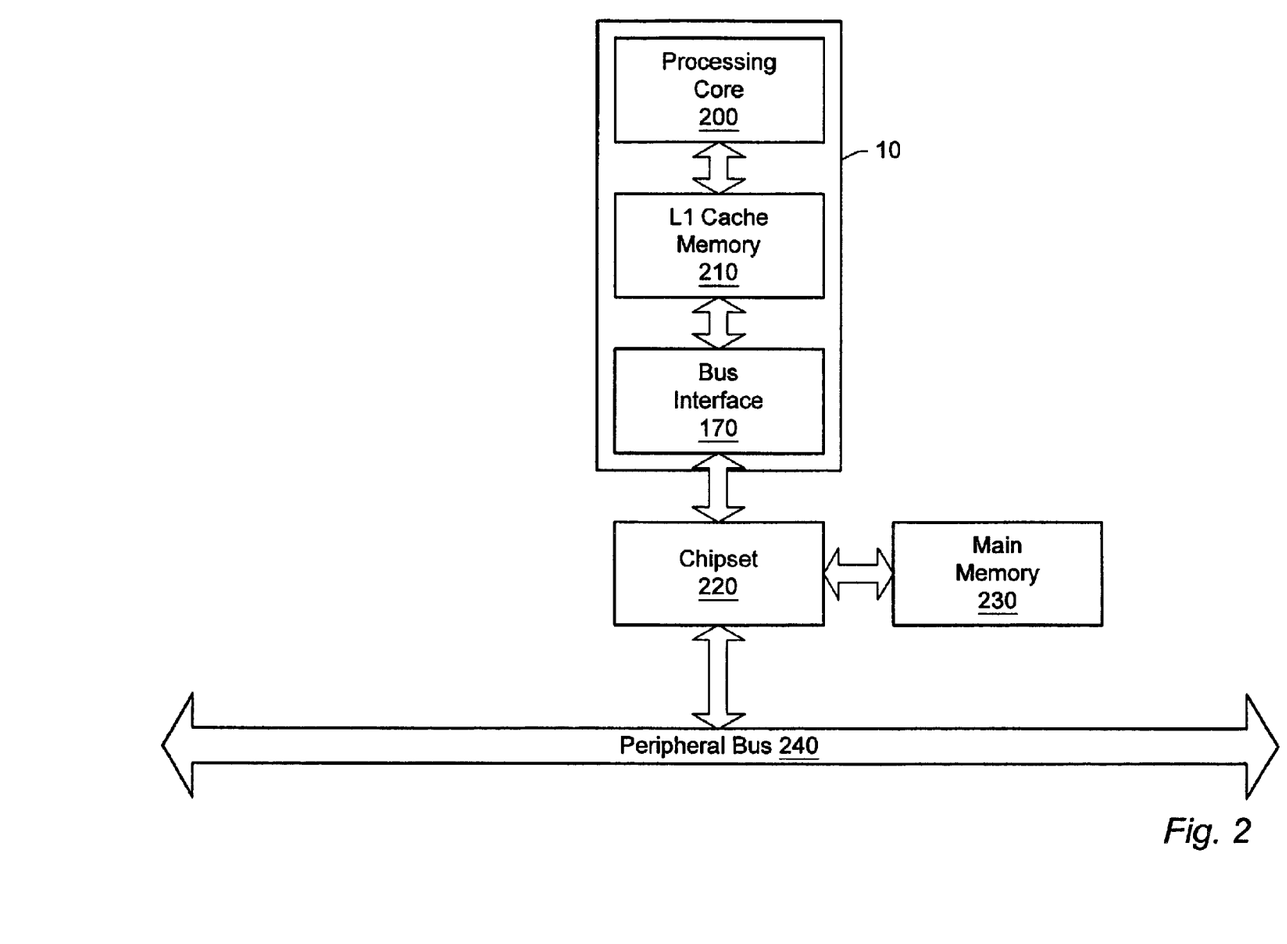
FIG. 2 is a block diagram of one embodiment of a computer system including the microprocessor of FIG. 1.

FIG. 2 is a block diagram illustrating one embodiment of a processor 10, chipset 220, memory 230 and peripheral bus 240. Processor 10 includes a processing core 200, L1 cache memory 210 and bus interface 170. Processor 10 is coupled to chipset 220 via bus interface 170. Chipset 220 is coupled to memory 230 and peripheral bus 240. L1 cache memory 210 may include both an instruction cache and a data cache.

As discussed above, when memory is accessed there is a potential for delay between the time the request to memory 230 is made (either to read or write data) and the time when the memory access is completed. This delay is referred to as "latency" and can limit the performance of the computer. In particular, when performing a load from memory 230, if the required load data is not present in the data cache 210 or a buffer of the processor, an access to main memory 230 must be performed. Upon accessing system memory 230, today's processors may have to wait 20 or more clock cycles before receiving the requested data and may be stalled in the meantime. Because a level 1 data cache 210 is typically much closer to the processing core 200 than system memory 230, when load data is present in the data cache 210 (a cache "hit"), the required data may be available much more quickly. The percentage of time required data is present in the cache 210 is frequently referred to as the "hit rate". Consequently, increasing the cache hit rate is a desirable goal. Further, when a load miss does occur, and dependent instructions may be stalled, it is desirable to have other non-dependent instructions available for execution so as to more fully utilize the resources of the processor.

Latency Hiding Overview

The apparatus and method described herein may hide load access latencies and more fully utilize the resources of the processor. In general, fetched instructions are scanned for loads. A load prediction table and circuitry are utilized to maintain load fetch addresses and a load miss count. On successive executions of the load, the table is checked for a corresponding entry. If an entry for the load is found, a prediction of the load fetch address is made. If the load ultimately misses, the load miss count is incremented. Upon the count reaching a threshold, the load is predicted to miss on a next execution and a new thread of instructions is setup. Instructions may then issue from multiple threads in the same clock cycle and the processor resources may be more fully utilized. In the following, load address prediction and thread setup are discussed.

Load Address Prediction and Prefetch

Figure 3:
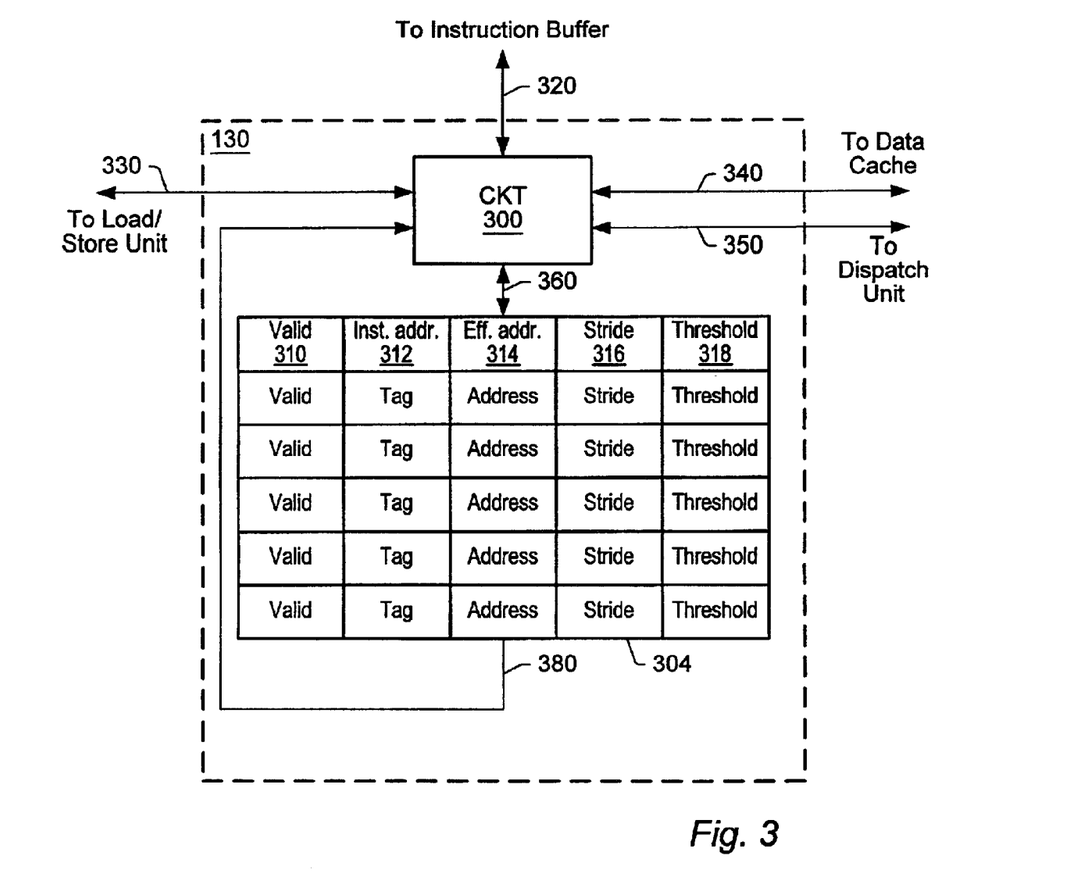
FIG. 3 is an illustration of a load prediction unit.

One way of increasing the likelihood of a cache hit is to fetch load data earlier than it would otherwise be fetched. FIG. 3 is a diagram of load prediction unit 130. Included in load prediction unit 130 are predict/thread circuitry 300, and prediction table 304. Predict/thread circuitry 300 is coupled to prediction table 304 via buses 360 and 380, Predict/thread circuitry 300 is further coupled to load/store unit 150 via bus 330, instruction buffer 104 via bus 320, data cache 160 via bus 340, and dispatch unit 106 via bus 350. In one embodiment, prediction table 304 may be configured as a memory structure having rows of entries with five entries per row. Each row in prediction table 304 may represent a detected load instruction. Included in each entry are a valid bit 310, instruction address 312, effective address 314, stride 316 and threshold 318.

Load Prediction Entry Creation

Predict/thread circuit 300 scans instructions in instruction buffer 104 for load instructions. In one embodiment, load instructions may be detected by comparing instruction opcodes to known load instruction opcodes. Upon detecting a load instruction, predict/thread circuit 300 checks load prediction table 304 for an entry corresponding to the detected load. Valid bit 310 may be used to indicate a valid entry in load prediction table 304. Predict/thread circuit 300 may detect a corresponding entry in load prediction table 304 for a detected load instruction by comparing the address of the load instruction to instruction address fields 312 in load prediction table 304 of valid entries. If no corresponding entry is found in load prediction table 304, no load prediction will occur and instruction execution continues normally. In addition, an entry may be created for a load which does not currently have an entry. To create an entry in load prediction table, circuit 300 determines if there currently exists an unused entry in load prediction table 304. If no unused entry is found in load prediction table 304, predict/thread circuit 300 may use any number of well known replacement algorithms to select an existing entry to replace. Such algorithms may include random selection or the least recently used entry. If an unused entry is found, which may be detected by an invalid indication in the valid field 310, the address of the detected load is inserted in the instruction address field 312 of the entry and the valid field 310 is set to indicate the entry is now valid. Subsequently, upon calculation of the effective address of the detected load, load/store unit 150, or alternatively a functional unit 140, conveys the address of the load and the calculated effective address to circuit 300 upon bus 330. Circuit 300 then identifies the corresponding entry in load prediction table 304 using the conveyed instruction address and enters the effective address in the address field 314. The stride field 316 for the new entry may be initialized to a predetermined value and the threshold field 318 is initialized to indicate no load mispredictions have occurred. In one embodiment, threshold field 318 may be initialized to zero and the stride field 316 may be initialized to a value such as zero, two or four.

Load Prediction and Stride Update

If upon searching load prediction table 304, predict/thread circuit 300 does find an entry for the load instruction, the contents of the corresponding effective address 314 and stride 316 fields are conveyed to circuitry 300. Circuit 300 then computes the predicted effective load address by adding the received address 314 to the received stride 316. Circuit 300 may then convey the effective address to the data cache 160. If data cache 160 does not contain the data associated with the effective address, a prefetch of the data from memory is done. If when the load instruction is executed, the prediction was correct, the data for the load will already be in the cache and no long latency load from memory will be incurred. Therefore, instructions which are dependent on the load data are not stalled waiting for data to be loaded from memory.

When a predicted load is executed and its actual effective address is calculated, the address of the load instruction, along with the actual effective address, and an indication of whether the address hit or miss in the data cache 160 is conveyed to load prediction unit 130 via bus 330. Predict/thread circuit 300 then locates the entry in load prediction table 304 corresponding to the conveyed address of the instruction. If the prediction was incorrect, predict/thread circuit 300 calculates the difference between the received actual effective address and the contents of the address field 314. The calculated difference is then entered into the stride field 316, the received actual effective address is entered into the address field 314 and the miss count field 318 is incremented. In one embodiment, the miss count field 318 is a saturating counter. On the other hand, if the prediction was correct, the received actual effective address is entered into the address field 314, the stride field 316 is updated and the miss count field 318 remain unchanged.

By using the above load prediction strategy, loads for data are executed earlier without placing an additional burden on the system bus or requiring additional instructions like a prefetch instruction. Consequently, load latencies may be reduced and performance may be increased.

Because some load predictions will be incorrect, a mechanism for determining which predictions will miss and providing alternative work for the processor while the load occurs is desirable. The mechanism described below predicts which load predictions will miss and creates a new thread of execution which may be executed so as to more fully utilize the resources of the processor.

Multi-Threading

One feature of microprocessors is the degree to which they can take advantage of parallelism. Parallelism is the execution of instructions in parallel, rather than serially. Superscalar processors are able to identify and utilize fine grained instruction level parallelism by executing certain instructions in parallel. However, this type of parallelism is limited by data dependencies between instructions. By identifying higher levels of parallelism, computer systems may execute larger segments of code, or threads, in parallel and a reduction in idle processor resources may be attained.

Figure 4:
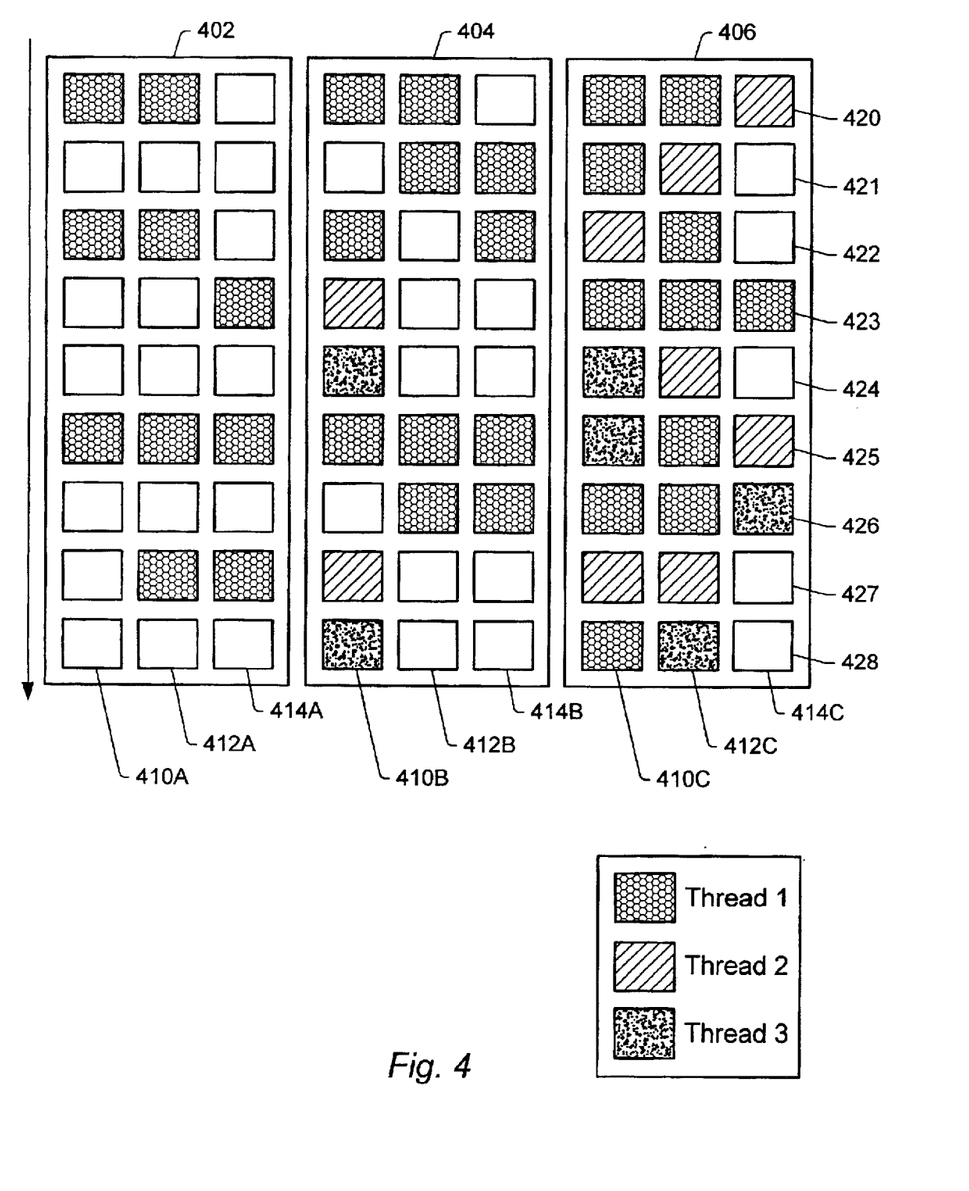
FIG. 4 is an illustration of superscalar, multithreaded, and simultaneous multithreaded instruction issue.

FIG. 4 is a diagram illustrating how higher levels of parallelism may reduce the idle time, or waste, of processor resources. Included in FIG. 4 are three different ways a given processor may issue instructions to its functional units. A superscalar 402, multithreaded superscalar 404, and simultaneous multithreaded superscalar 406 are shown. The processor illustrated includes three functional units which are represented by the issue slots 410A–410C, 412A–412C, and 414A–414C. Nine process or clock cycles 420–428 are represented in nine rows of FIG. 4 with time increasing from earlier 420 to later 428.

Superscalar 402 approach executes a single thread of instructions. On each clock cycle, the processor may issue any instruction which has no outstanding dependencies to an available functional unit. As shown in FIG. 4, superscalar 402 approach is able to fill two functional units 410A and 412A in the first clock cycle 420, third clock cycle 422, and eighth clock cycle 427. In cycle four 423, only one functional unit 414A is filled and in cycle six 425, all three functional units are utilized. As can be seen, in all but one clock cycle, 425, one or more functional units are not utilized. On four clock cycles, 421, 424, 426, and 428, all functional units 410, 412, and 414 were idle. Consequently, the resources of the processor are frequently under utilized.

In the multithreaded 404 approach, the processor may maintain more than one thread of execution. On a given clock cycle, the multithreaded 404 processor may issue instructions from one of its threads. If the multithreaded 404 processor currently is maintaining three threads of execution and a first thread, Thread 1, is unable to issue any instructions due to dependencies, the processor may issue ready instructions from one of the remaining threads in order to better utilize the functional units. In FIG. 4, the multithreaded approach 404 illustrates four different clock cycles, 423, 424, 427, and 428, in which instructions from an alternate thread were issued. By having multiple threads of execution from which to choose, four clock cycles in which all functional units would have otherwise been idle were better used by issuing instructions from alternate threads. However, in the multithreaded approach 404, because instructions issue from a single thread on a given clock cycle, if sufficient instruction level parallelism is not present within a given thread, functional units may remain idle.

The third approach illustrated by FIG. 4 is that of simultaneous multithreading 406. In this approach, multiple threads may be concurrently maintained by the processor and instructions may be issued from multiple threads on a given clock cycle. Using this approach, functional units 410C and 412C are fully utilized on every clock cycle 420–428 and functional unit 414C is frequently utilized. Overall, the simultaneous multithreaded 406 approach more fully utilizes the resources of the processor. Consequently, performance of the processor may be improved. Using a multithreaded approach, a mechanism for hiding load latencies is presented.

Hiding Load Latency

As discussed above, load instructions which miss in the cache may result in long load latencies to memory. While the load prediction mechanism described above may improve the cache hit ratio, mispredictions may occur and a load latency incurred. These latencies may then result in underutilized processor resources due to instructions which are dependent on the load data. To better utilize processor resources, a mechanism is introduced which predicts which loads will miss and sets up an additional thread of instructions for execution. Instructions from the new thread may then issue in order to better utilize processor resources. In one embodiment, new thread instructions may issue on a load miss.

Figure 5:
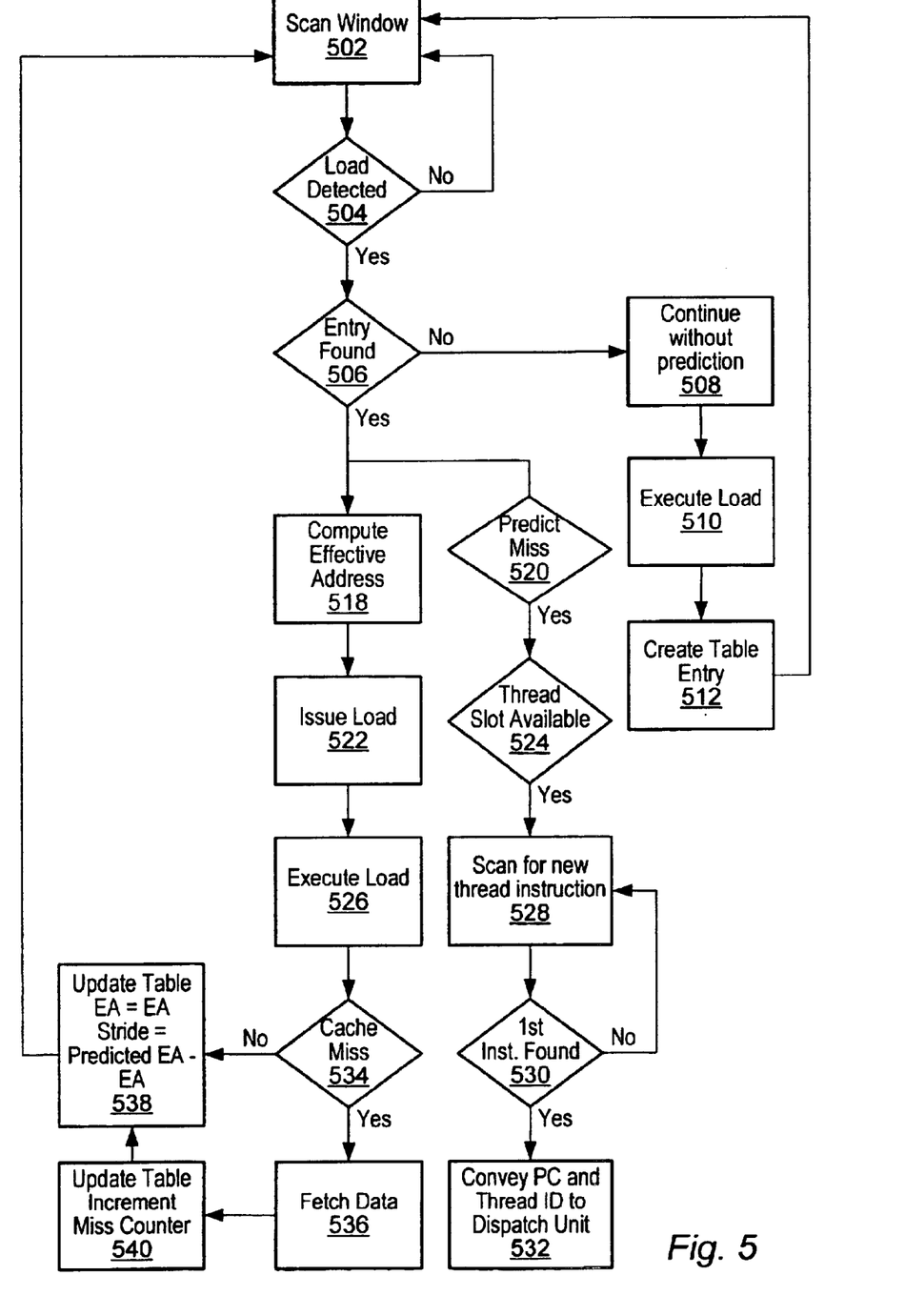
FIG. 5 is a flowchart illustrating load address prediction and new thread instruction identification.

FIG. 5 is a flowchart illustrating one embodiment of the load prediction and thread creation mechanism. In block 502, instruction window or buffer is scanned for load instructions. If a load is detected (decision block 504), flow continues to decision block 506. If no load is detected in block 504, control remains with block 502. In decision block 506, a load prediction table is searched for an entry which corresponds to the detected load instruction. If no entry is found for the detected load instruction, execution continues without a prediction, blocks 508 and 510. Subsequent to executing the unpredicted load, an entry is created (block 512) for the load in the load prediction table. On the other hand, if an entry for the detected load is found in the load prediction table (block 506), the effective address of the load is calculated (block 518) and a miss count indicator in the table is checked (block 520) to determine if a load miss is predicted. If a load miss is indicated (block 520), a determination is made as to whether a thread slot is available (block 524). If no thread slot is available, an additional thread is not setup. On the other hand, if a thread slot is available, the load prediction unit scans (block 528) for the first instruction of a new thread (block 530). In one embodiment, when the first instruction of a new thread is found (block 530), information regarding the new thread is conveyed to the dispatch unit (block 532). Such information may include the address of the first instruction of the new thread and a thread unit identifier. Also, subsequent to computing the effective address (block 518) of a detected load, the predicted load is issued (block 522) and executed (block 526). If the predicted load subsequently hits in the data cache (block 534), an indication of this fact along with related information is conveyed to the load prediction unit where the corresponding load prediction table entry is updated (block 538). In one embodiment, this table entry update includes entering the difference between the previous effective address and the current effective address in a stride field of the corresponding entry. In addition, the update includes entering the actual effective address in the table entry. On the other hand, if a cache miss occurs (block 534) a fetch of the data is required (block 536) and an indication of this miss is conveyed to the load prediction unit. The corresponding load prediction table entry is then updated as before (block 538), with the addition of incrementing a miss counter (block 540).

By utilizing the above described mechanism, loads may be detected early and effective addresses predicted. Using the predicted load address, data may be prefetched if necessary. In addition, if a load is predicted to miss, a new thread of executable instructions may be setup. In one embodiment, instructions from the newly created thread may be issued concurrently with instructions from another thread. In this manner, functional units of the processor may be more fully utilized and latencies associated with loads which miss in the data cache may be hidden by the execution of instructions from an additional thread.

New Thread Identification and Setup

As described above, if the load prediction unit predicts a load instruction will miss in the cache, an additional thread of execution may be created. In one embodiment, the first instruction of a new thread is identified in one of three ways. The first type of instruction which may serve as a new thread's first instruction is an instruction which loads from memory to the same register as the load which is predicted to miss. The second way of selecting a new thread involves selecting a subroutine branch as a first instruction. The third way involves selecting as a first instruction in a new thread an instruction which immediately follows a loop iteration branch instruction.

Figure 6:
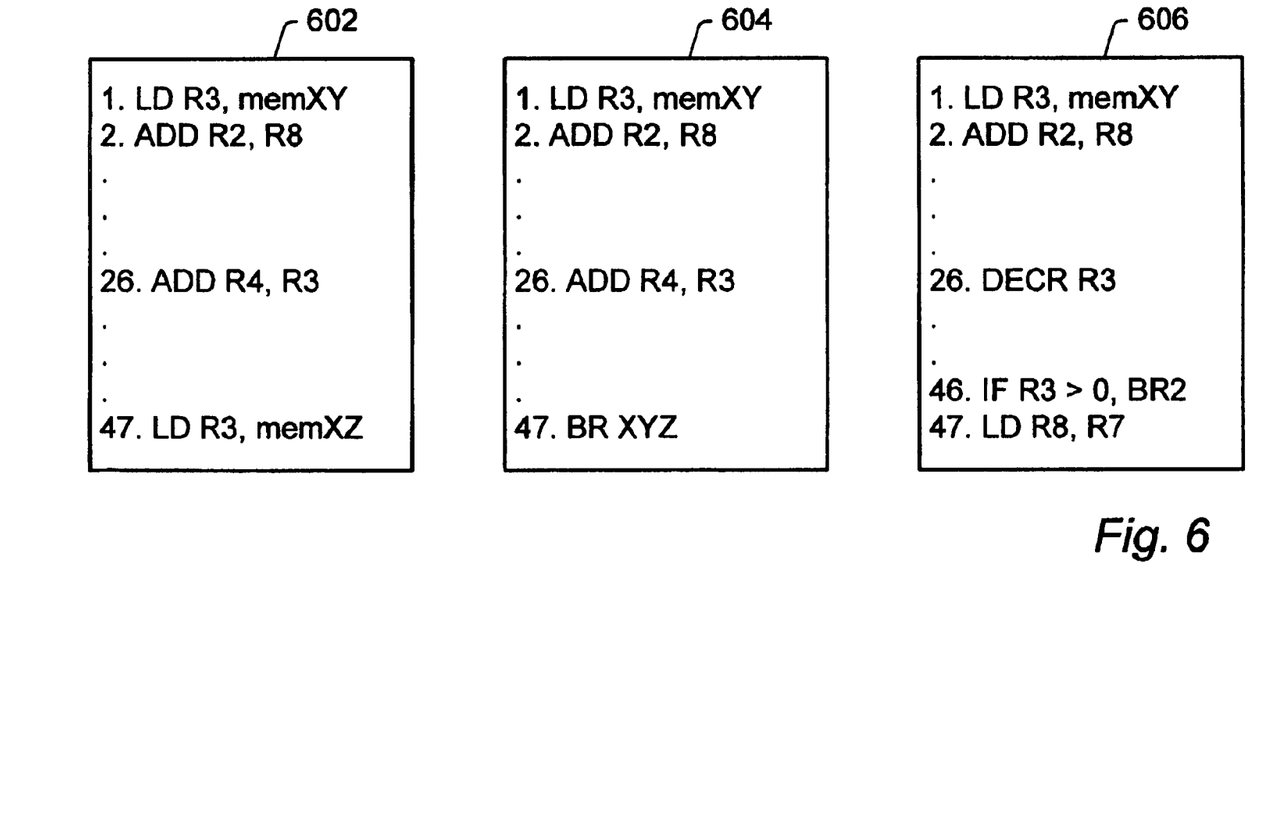
FIG. 6 illustrates three ways in which a first instruction of a new thread may be identified.

FIG. 6 includes an illustration of each of three ways in which the first instruction of a new thread may be identified. Included in FIG. 6 are three instruction sequences, 602, 604 and 606. Instruction sequence 602 illustrates the selection of a load to the same register as a predicted miss load instruction. Sequence 602 includes 47 instructions of which instructions 1, 2, 26 and 47 are shown. Instruction 1 is a load from memory to register 3, R3. Instructions 2 and 26 are ADD instructions and instruction 47 is another load from memory to R3. In the code segment 602 depicted, instruction 47 is the first instruction subsequent to instruction 1 in which there is a load from memory to R3. Using instruction sequence 602, instruction 1 may be identified by the load prediction unit as an instruction which will miss in the cache. Consequently, a determination is made as to whether an additional thread slot is available. In one embodiment, the dispatch unit is configured to return the ID of a thread unit if one is available. If a thread slot is available, a scan for the start of a new thread begins. In instruction sequence 602, instruction 47 is identified as the first instruction of a new thread. It is assumed that one or more instructions between instruction 1 and instruction 47 may depend on the contents of R3 which are loaded from memory in instruction 1. Consequently, a first instruction for a new thread is not chosen prior to instruction 47. In one embodiment, an indication of the new thread unit ID and an instruction address associated with instruction 47 is conveyed to the dispatch unit. Dispatch unit may then setup a new thread of execution based on the received instruction address.

A second identification of a first instruction in a new thread is illustrated by instruction sequence 604 in FIG. 6. Sequence 604 includes 47 instructions of which instructions 1, 2, 26 and 47 are shown. Instruction 1 is a load from memory to register 3, R3. Instruction 1 in sequence 604 may be identified by the load prediction unit as an instruction which will miss in the cache. As before, if a thread unit is available, the load prediction unit scans for the first instruction on a new thread. In sequence 604, instruction 47 is identified as an unconditional branch to a subroutine and is selected as the first instruction in a new thread. Consequently, the address of the instruction and the received thread unit ID are conveyed to the dispatch unit where a new thread may be initialized and executed.

Finally, instruction sequence 606 illustrates a third way of selecting a first instruction in a new thread. Sequence 606 includes 47 instructions of which instructions 1, 2, 26, 46 and 47 are shown. In sequence 606, instructions 2 through 46 may represent the body of an iterative loop. Instruction 1 is a LD of register R3 with an initial value. Subsequently, in instruction 26, the value of R3 is decrement by a decrement instruction, DECR. Finally, instruction 46 represents a test of the value of R3. If the value of R3 is greater than zero, the control returns to instruction 2. Otherwise, control passes to instruction 47. In this instruction sequence, instruction 47, the instruction immediately following a loop iteration branch instruction, is selected as the first instruction in a new thread. Consequently, the address of the instruction and the received thread unit ID are conveyed to the dispatch unit where a new thread may be initialized and executed.

Figure 7:
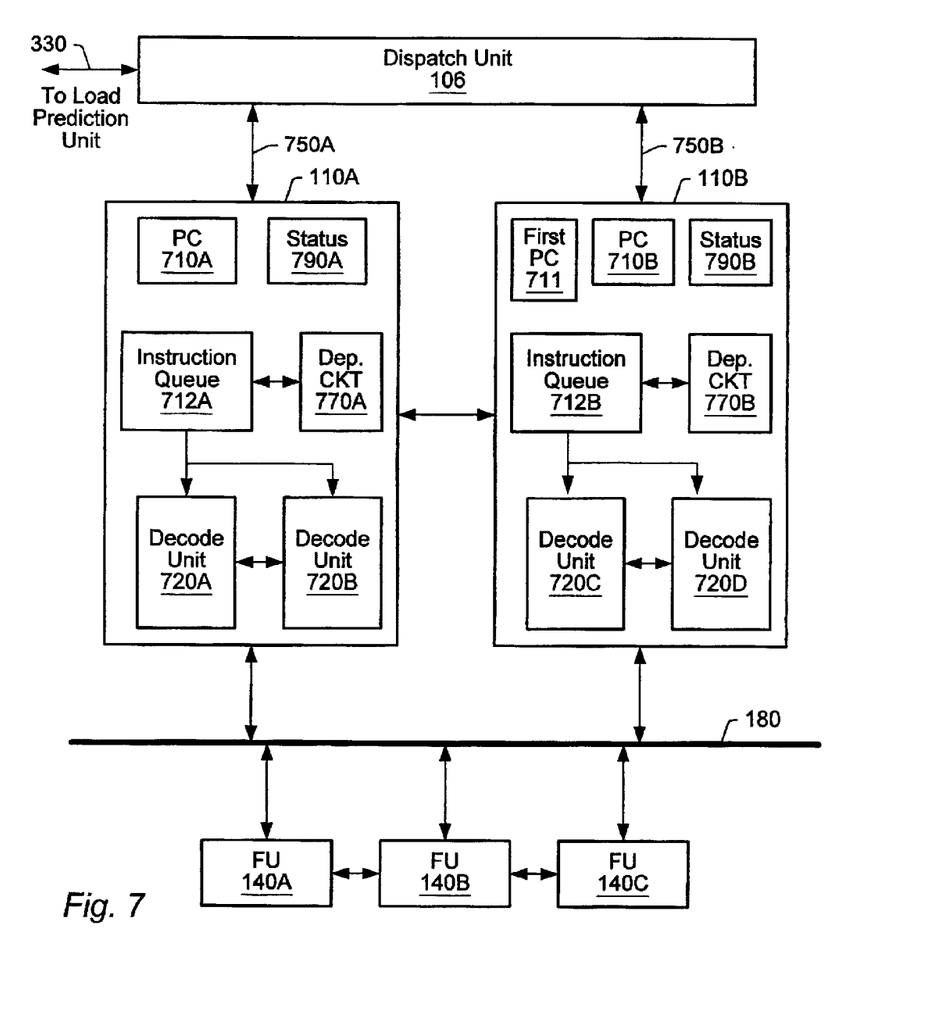
FIG. 7 is a block diagram illustrating one embodiment of a dispatch unit, thread units and functional units which may be included in the microprocessor of FIG. 1.

Now turning to FIG. 7, a block diagram of one embodiment of a dispatch unit 106, two thread units 110A–110B and three functional units 140A–140C are shown. Dispatch unit 106 is coupled to load prediction unit via bus 330 and to thread units 110 via buses 750A and 750B. Thread units 110 are coupled to bus 180 which is also coupled to functional units 140. Thread units 110A–110B include, as shown, an instruction address register 710A–710B instruction queue 712A–712B, instruction reordering and dependency checking circuitry 770A–770B, status registers 790A–790B and decode units 720A–720D. In addition, thread unit 110B includes a first PC register 711. Instruction queues 712 are coupled to decode units 720. Circuitry 770 is coupled to instruction queue 712 and decode units 720. Status register 790 includes a reservation bit and an active bit. Also, in one embodiment, one thread unit 110A may be considered the main thread unit. The main thread unit 110A executes all single threaded code and may be the source for additional threads of execution.

As discussed above, when a load is predicted to miss, the load prediction unit may attempt to initiate the creation of an additional thread. The load prediction unit conveys a request for a thread unit ID to dispatch unit 106. Dispatch unit 106 determines if any thread units are not reserved by checking the reservation bit in the status register 790 of the thread units. If no thread units 110 are available, an indication of this fact is conveyed to the load prediction unit. Otherwise, if a thread unit 110B is available, dispatch unit 106 sets the reservation bit of the status register 790 of the available thread unit 110B to indicate the thread unit is reserved and conveys a thread unit ID to the load prediction unit. Upon receiving a thread unit ID, load prediction unit begins scanning for the first instruction of a new thread. Otherwise, if no thread slot is available, load prediction unit does not scan for the start of a new thread. When load prediction unit 130 identifies the first instruction of a new thread, the address of first instruction is conveyed to dispatch unit 106, along with the previously received corresponding thread ID. Dispatch unit 106, upon receiving the conveyed first instruction address and thread ID, sets the active bit in the status register 790 of the corresponding thread unit to indicate the thread unit is active and stores the instruction address in both the thread unit PC register 710 and first PC register 711. On subsequent clock cycles, dispatch unit 106 fetches instructions for active threads based on the contents of the PC register of the thread slot. Various instruction fetch policies may be adopted for the active threads, including fetching for a single thread unit 110 on a given cycle or fetching for multiple thread slots on a given clock cycle. Fetching for a second thread of instructions in a second thread slot 110B may continue until the PC of the main thread 110A equals the contents of the first PC register 711 of the second thread unit 710B. In addition, fetching for a second thread of instructions in a second thread slot 110B may be discontinued when a load which is predicted to miss is detected in the instruction stream of the second thread. When instruction fetching ceases in a thread unit 110B, the active and reservation bits of the status register 790B may be cleared to indicate the thread unit is no longer active. Likewise, instruction fetching in a main thread unit 110A will not include instructions already fetched in a second thread unit 110B. In other embodiments, more than two thread units may be used and the detection of a load predicted to miss in a second thread may result in the creation of a third thread and so on.

Instruction Issue and Data Dependency

In one embodiment, each thread unit supports out of order execution of instructions. Dependency checking circuitry 770 may be configured to detect dependencies among instructions within a single thread unit. In addition, dependency checking circuitry may be configured to communicate dependency information with other thread units. In one embodiment, instructions may issue from multiple thread units in a single clock cycle. For example, main thread unit 110A may issue all possible instructions free of data dependencies on a clock cycle and if any functional units remain available, a next thread unit may issue any non-dependent instructions in the same clock cycle. Consequently, main thread unit 110A, upon which a second thread may have data dependencies, may have priority in the use of the processor's resources and processor resources which may otherwise be idle may be more fully utilized. Handling of data dependencies may be accomplished in a number of well known ways. In a first embodiment, instructions in all currently active thread units may be checked against one another for dependencies. If an instruction is free of dependencies it may issue. Alternatively, instructions may be checked for dependencies within a single thread unit. Various mechanisms may be employed in the checking of dependencies. For example, dependency checking circuitry 770 may include additional comparison circuitry or a future file for dependency checking and resolution. In addition, dependency checking circuitry may employ mechanisms to support out-of-order issue and execution of instructions such as a reorder buffer.

Numerous variations and modifications will become apparent to those skilled in the art once the above disclosure is fully appreciated. It is intended that the following claims be interpreted to embrace all such variations and modifications.

What is claimed is:

1. A microprocessor comprising:
   an instruction buffer, wherein said instruction buffer is configured to store a plurality of instructions;
   a load prediction unit coupled to said instruction buffer, wherein said load prediction unit comprises a load prediction table with a plurality of entries and circuitry which supports load address prediction and new thread creation, wherein the plurality of entries in the load prediction table comprise a valid field, an instruction address field, an effective address field, a stride field, and a threshold field;

wherein the load prediction unit is configured to:
    detect a first load instruction of said plurality of instructions;
    predict said first load instruction will miss, in response to detecting contents of a threshold field which corresponds to the first load instruction equals a threshold value;
    predict a first load address of said first load instruction; and
    identify a first instruction of a new thread in response to predicting said first detected load instruction will miss, wherein identifying said first instruction comprises comparing a destination register of said first detected load instruction with a destination register of instructions in said instruction buffer, wherein said destination register of said first instruction is the same register as said destination register of said first detected load instruction, wherein said instructions in said instruction buffer are subsequent in program order to said first detected load instruction; and a data cache coupled to said load prediction unit, wherein said data cache is configured to:
    receive said first load address; and
    fetch data corresponding to said first load address in response to detecting said data is not present in said data cache.

2. The microprocessor of claim 1, wherein said circuitry is configured to detect said first load instruction by scanning said plurality of instructions in said instruction buffer for instructions with opcodes which correspond to load instructions.

3. The microprocessor of claim 1, wherein said load prediction unit is configured to create a first entry in said load prediction table for said first load instruction by storing an instruction address in an instruction address field of an entry and storing an effective address in an effective address field of said entry and storing a value in a valid field of said entry which indicates said entry is valid.

4. The microprocessor of claim 3, wherein a stride value is stored in a stride field of said entry and a threshold field of said entry is initialized to indicate no misses for said first load instruction have been recorded.

5. The microprocessor of claim 3, wherein said load prediction unit is configured to detect said first entry in said load prediction table by comparing an instruction address of said first detected load instruction to addresses in instruction address fields of said plurality of entries, wherein said instruction address of said first detected load instruction corresponds to said instruction address stored in said instruction address field of said first entry, wherein said valid field of said first entry indicates said entry is valid.

6. The microprocessor of claim 3, wherein said load prediction unit is configured to predict a load address of said first detected load instruction by adding a first contents of an effective address field of said first entry to a second contents of a stride field of said first entry.

7. The microprocessor of claim 4, wherein said load prediction unit is configured to update an entry of said first detected load instruction of said load prediction table by storing a difference between a received effective address and said contents of said effective address field in said stride field and by storing said received effective address in said effective address field, in response to detecting said detected load instruction hit in said data cache.

8. The microprocessor of claim 4, wherein said load prediction unit is configured to update an entry of said first detected load instruction of said load prediction table by storing a difference between a received effective address and said contents of said effective address field in said stride field and by storing said received effective address in said effective address field and by incrementing contents of a threshold field of said first entry, in response to detecting said detected load instruction missed in said data cache.

9. The microprocessor of claim 1, wherein said load prediction unit is further configured to predict a load instruction will miss.

10. The microprocessor of claim 1, wherein said first instruction is a load instruction.

11. The microprocessor of claim 1, wherein said first instruction is said identified by detecting said first instruction is an unconditional branch.

12. The microprocessor of claim 1, wherein said first instruction is said identified by detecting said first instruction immediately follows a loop iteration branch.

13. A method of load address prediction and thread instruction identification is contemplated, said method comprising:
    detecting a first instruction of a plurality of instructions in an instruction buffer is a load instruction;
    predicting a load address for said first instruction, in response to detecting a valid entry exists in a load prediction table for said first instruction;
    updating said entry in said load prediction table;
    predicting said first instruction will miss, in response to detecting a miss threshold condition has been met; and
    identifying a first thread instruction of a new thread, in response to said predicting said first instruction will said miss
    wherein said identifying said first thread instruction of said new thread comprises:
        comparing a destination register of said first instruction with a destination resister of a second plurality of instructions in said instruction buffer;
        detecting a destination register of a second instruction of said second plurality of instructions is the same register as said destination register of said first instruction; and
        selecting said second instruction as said first thread instruction, wherein said second plurality of instructions in said instruction buffer are subsequent in program order to said first instruction.

14. The method of claim 13, wherein said detecting a first instruction of a plurality of instructions in an instruction buffer is a load instruction comprises scanning said plurality of instructions for instructions with opcodes corresponding to load instructions.

15. The method of claim 13, further comprising determining if a valid entry exists in a load prediction table for said first instruction, wherein said determining comprises comparing an instruction address of said first instruction to addresses in instruction address fields of said load prediction table, wherein said instruction address of said first instruction corresponds to said instruction address stored in said instruction address field of said valid entry, wherein said valid field of said valid entry indicates said entry is valid.

16. The method of claim 13, further comprising creating an entry in said load prediction table for said first instruction, in response to detecting no valid entry corresponding to said first instruction exists, wherein said creating comprises:
    storing an instruction address in an instruction address field of an entry;

storing an effective address in an effective address field of said entry; and storing a value in a valid field of said entry, wherein said value indicates said entry is valid.

17. The method of claim 16, further comprising:

storing a stride value in a stride field of said entry; and initializing a threshold field of said entry to indicate no misses for said first instruction have been recorded.

18. The method of claim 13, further comprising computing a predicted address for said first instruction, in response to detecting said valid entry does exists, wherein said computing comprises adding a first contents of an effective address field of said valid entry to a second contents of a stride field of said valid entry.

19. The method of claim 13, wherein said updating comprises:

storing a difference between a received effective address and contents of an effective address field of said entry, wherein said difference is stored in a stride field of said entry;

storing said received effective address in said effective address field of said entry; and incrementing contents of a threshold field of said first entry, in response to detecting a valid entry exists in said load prediction table for said first instruction and said first instruction missed.

20. The method of claim 13, wherein said updating comprises:

storing a difference between a received effective address and contents of an effective address field of said entry, wherein said difference is stored in a stride field of said entry; and storing a received effective address in said effective address field, in response to detecting a valid entry exists in said load prediction table for said first instruction and said first instruction hit.

21. The method of claim 13, wherein said predicting said first load instruction will miss comprises detecting a value in a threshold field of said entry equals a threshold value.

22. The method of claim 13, wherein said first thread instruction is a load instruction.

23. The method of claim 13, wherein said identifying said first thread instruction comprises:

detecting a second instruction of a second plurality of instructions in said instruction buffer is an unconditional branch; and selecting said second instruction as said first thread instruction, wherein said second plurality of instructions in said instruction buffer are subsequent in program order to said first instruction.

24. The method of claim 13, wherein said identifying said first thread instruction comprises:

detecting a second instruction of a second plurality of instructions in said instruction buffer immediately follows a loop iteration branch; and selecting said second instruction as said first thread instruction, wherein said second plurality of instructions in said instruction buffer are subsequent in program order to said first instruction.

* * * * *